(12) United States Patent
    Matsumoto et al.

(10) Patent No.: US 12,608,506 B2
(45) Date of Patent: Apr. 21, 2026

(54) INFORMATION PROCESSING DEVICE

(71) Applicant: TOYOTA JIDOSHA KABUSHIKI KAISHA, Toyota (JP)

(72) Inventors: Shigeki Matsumoto, Nagoya (JP); Naoya Oka, Nagakute (JP); Hidetaka Eguchi, Nagoya (JP); Shigeru Ichikawa, Nagoya (JP); Takeshi Yamada, Nagoya (JP); Masayo Nagai, Nagoya (JP); Ryosuke Yamamoto, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 18/673,938

(22) Filed: May 24, 2024

(65) Prior Publication Data

US 2025/0028860 A1      Jan. 23, 2025

(30) Foreign Application Priority Data

Jul. 21, 2023    (JP) ................................. 2023-118932

(51) Int. Cl.
    *G06F 21/62*        (2013.01)
(52) U.S. Cl.
    CPC ................................. *G06F 21/6254* (2013.01)

(58) Field of Classification Search
    CPC .......................... G06F 21/6254; G06F 21/6245
    See application file for complete search history.

(56) References Cited

U.S. PATENT DOCUMENTS

| | | | |
|---|---|---|---|
| 11,170,130 B1 * | 11/2021 | Blumberg | H04L 63/123 |
| 2018/0174376 A1 * | 6/2018 | Avary | G07C 5/008 |
| 2021/0192867 A1 * | 6/2021 | Fang | G07C 5/0816 |
| 2021/0234859 A1 | 7/2021 | Sato | |
| 2023/0061997 A1 | 3/2023 | Nakashima et al. | |

FOREIGN PATENT DOCUMENTS

| | | |
|---|---|---|
| JP | 2021-117807 A | 8/2021 |
| JP | 2022-143653 A | 10/2022 |
| JP | 2023-032333 A | 3/2023 |

* cited by examiner

*Primary Examiner* — Bryan Y Lee
(74) *Attorney, Agent, or Firm* — Sughrue Mion, PLLC

(57) ABSTRACT

An information processing device acquires consent to collection of first data from a first vehicle from a first user via an in-vehicle device provided in the first vehicle at a first timing, and when re-consent from the first user is required to use of the first data collected from the first vehicle, issues a re-consent request to the in-vehicle device on condition that an owner of the first vehicle has not changed since the first timing.

6 Claims, 6 Drawing Sheets

1. ACQUIRE CONSENT TO PROVIDING DATA IN ADVANCE

2. IN-VEHICLE DEVICE ACQUIRES SENSOR DATA

IN-VEHICLE DEVICE
100

VEHICLE
10

3. SEND SENSOR DATA

SERVER DEVICE
200

4. ACQUIRE RE-CONSENT IF CONDITIONS OF USE OF DATA CHANGE

SERVER
DEVICE
200

1. ACQUIRE CONSENT TO
PROVIDING DATA
IN ADVANCE

3. SEND SENSOR DATA

4. ACQUIRE RE-CONSENT
IF CONDITIONS OF USE
OF DATA CHANGE

2. IN-VEHICLE DEVICE ACQUIRES
SENSOR DATA

IN-VEHICLE DEVICE
100

VEHICLE
10

FIG. 3A

USAGE DATA

| DATA ID | DATA TYPE | TRANSMISSION DESTINATION | ACQUISITION CONDITIONS | TRANSMISSION CYCLE | ... | CONDITIONS OF USE |
|---------|-----------|--------------------------|------------------------|--------------------|-----|-------------------|
| ... | IMAGE DATA | MANAGEMENT SERVER 200 | ACQUIRE AT SPECIFIED POINT (...) | ONLY ONCE | ... | ... |
| ... | LOCATION INFORMATION | MANAGEMENT SERVER 200 | WHEN IGNITION IS ON | EVERY SECOND | ... | ... |
| ... | PERSONAL INFORMATION | MANAGEMENT SERVER 200 | WHEN IGNITION IS TURNED ON | ONLY ONCE | ... | ... |
| ... | ... | ... | ... | ... | ... | ... |

FIG. 3B

CONSENT DATA

| USER ID | VEHICLE ID | DATE | DATA ID | TRANSMISSION DESTINATION | CONDITIONS OF USE | PROVISION OF DATA | ... |
|---------|-----------|------|---------|--------------------------|-------------------|-------------------|-----|
| U001 | V001 | ... | ... | MANAGEMENT SERVER 200 | ... | ALLOW | ... |
| U001 | V001 | ... | ... | MANAGEMENT SERVER 200 | ... | REFUSE | ... |
| ... | ... | ... | ... | ... | ... | ... | ... |

FIG. 3C

VEHICLE DATA

| VEHICLE ID | USER ID | UPDATE DATE | ... |
|-----------|---------|-------------|-----|
| V001 | U001 | ... | ... |
| V001 | U001 | ... | ... |
| ... | ... | ... | ... |

FIG. 3D

SENSOR DB

| USER ID | ACQUISITION DATE AND TIME | ACQUISITION LOCATION | DATA ID | SENSOR DATA | ... |
|---------|---------------------------|----------------------|---------|-------------|-----|
| U001 | ... | ... | ... | (Binary) | ... |
| U001 | ... | ... | ... | (Binary) | ... |
| ... | ... | ... | ... | ... | ... |

FIG. 4

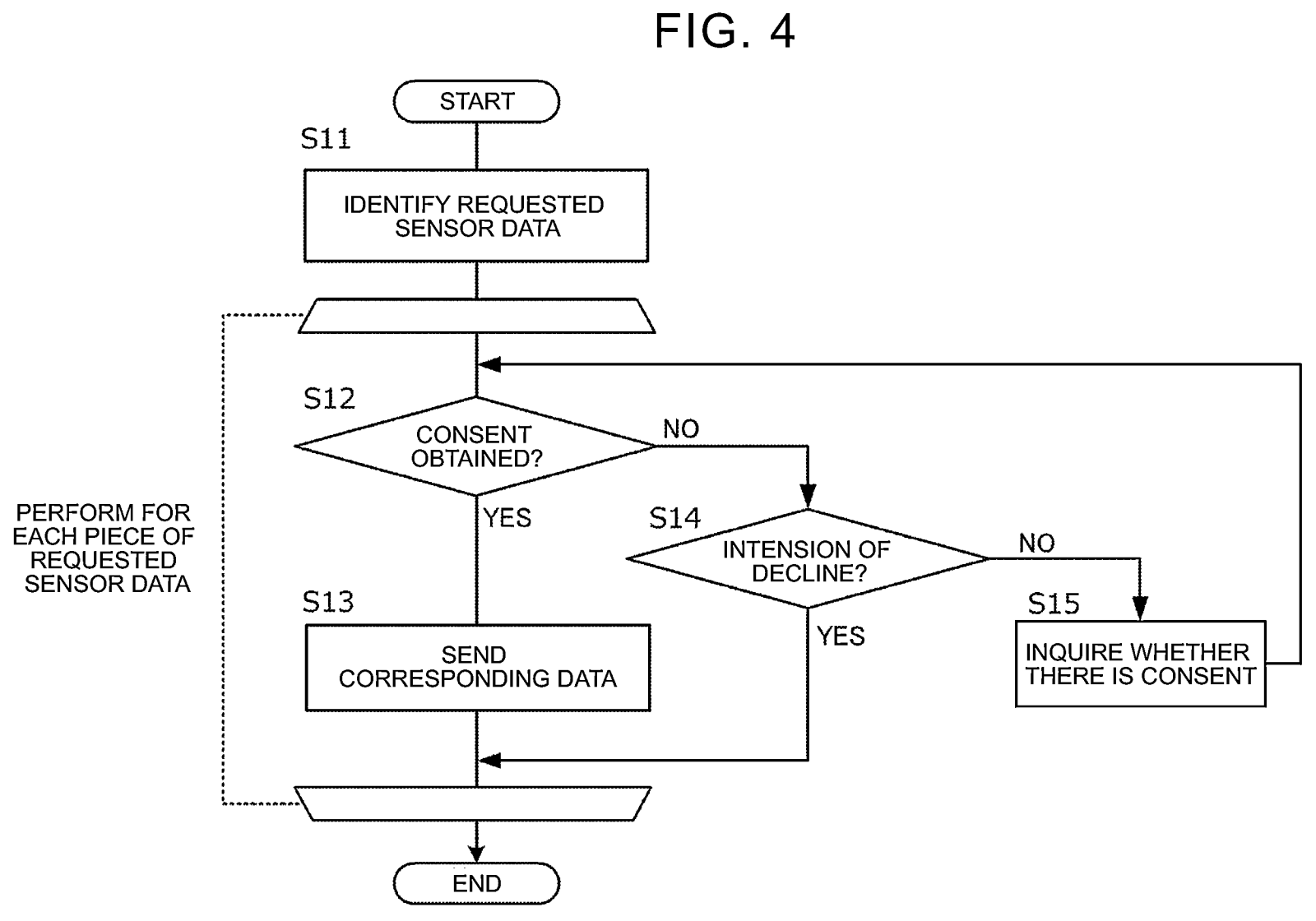

START

S11  IDENTIFY REQUESTED SENSOR DATA

S12  CONSENT OBTAINED?

NO

S14  INTENSION OF DECLINE?

NO

S15  INQUIRE WHETHER THERE IS CONSENT

YES

YES

S13  SEND CORRESPONDING DATA

END

PERFORM FOR EACH PIECE OF REQUESTED SENSOR DATA

FIG. 5

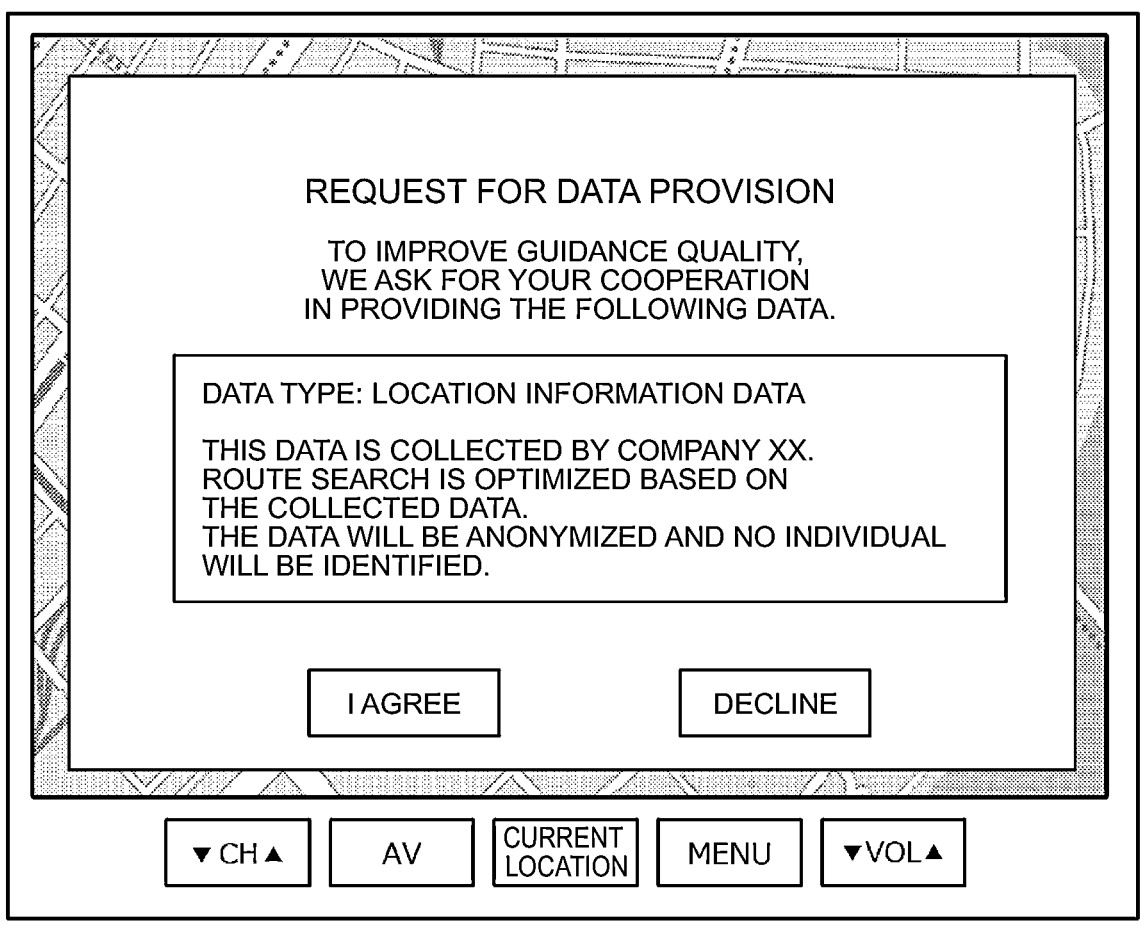

REQUEST FOR DATA PROVISION

TO IMPROVE GUIDANCE QUALITY,
WE ASK FOR YOUR COOPERATION
IN PROVIDING THE FOLLOWING DATA.

DATA TYPE: LOCATION INFORMATION DATA

THIS DATA IS COLLECTED BY COMPANY XX.
ROUTE SEARCH IS OPTIMIZED BASED ON
THE COLLECTED DATA.
THE DATA WILL BE ANONYMIZED AND NO INDIVIDUAL
WILL BE IDENTIFIED.

I AGREE          DECLINE

▼CH▲     AV     CURRENT LOCATION     MENU     ▼VOL▲

INFORMATION PROCESSING DEVICE

CROSS-REFERENCE TO RELATED APPLICATION

This application claims priority to Japanese Patent Application No. 2023-118932 filed on Jul. 21, 2023, incorporated herein by reference in its entirety.

BACKGROUND

1. Technical Field

The present disclosure relates to techniques for collecting information from vehicles.

2. Description of Related Art

In recent years, there has been a demand for proper management of personal information. In this regard, for example, Japanese Unexamined Patent Application Publication No. 2021-117807 (JP 2021-117807 A) discloses a system for obtaining consent to providing data from a user at low cost.

SUMMARY

It is an object of the present disclosure to appropriately acquire consent to collection of information from an information provider.

An information processing device according to an aspect of an embodiment of the present disclosure includes a control unit configured to acquire consent to collection of first data from a first vehicle from a first user via an in-vehicle device provided in the first vehicle at a first timing, and when re-consent from the first user is required to use of the first data collected from the first vehicle, issue a re-consent request to the in-vehicle device on condition that an owner of the first vehicle has not changed since the first timing.

Other aspects include a method that is performed by the above device, a program for causing a computer to perform the method, and a computer-readable storage medium storing the program in a non-transitory manner.

According to the present disclosure, it is possible to appropriately acquire consent to collection of information from an information provider.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A shows an example of usage data stored by the in-vehicle device;

FIG. 3B shows an example of consent data stored by an in-vehicle device;

FIG. 3C shows an example of vehicle data stored by the in-vehicle device;

FIG. 3D shows an example of data stored by a server-device;

FIG. 4 is a flowchart of a process that is performed by the in-vehicle device;

FIG. 5 shows an example of a screen for querying consent to providing data.

DETAILED DESCRIPTION OF EMBODIMENTS

Figure 1:
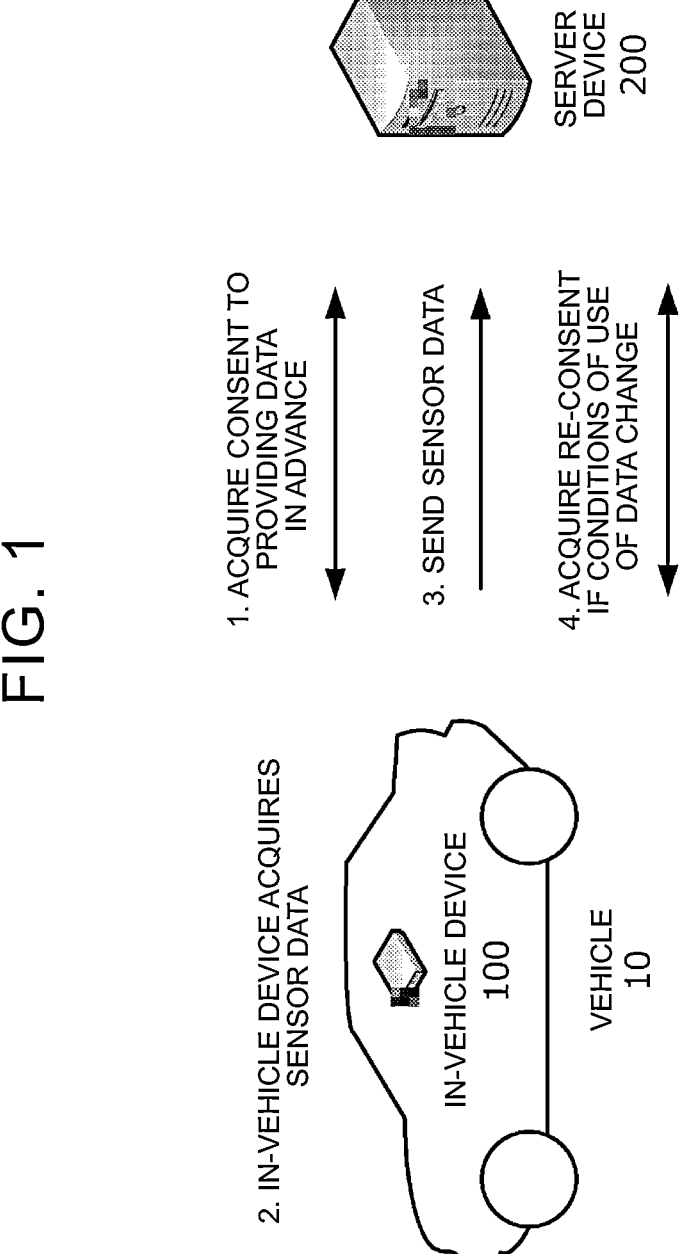
FIG. 1 is a schematic diagram of a vehicle system according to a first embodiment.

In recent years, attempts have been made to use data collected from automobiles. It is expected that various services can be provided by using data collected from vehicles as big data.

On the other hand, the data transmitted from the vehicle may include personal information and personal information. Such data may cause privacy problems by linking with individuals, such as location information, as well as personal information itself.

For this reason, an attempt is made to conclude a data provision contract with a user (for example, an owner or a driver of a vehicle) after giving an explanation regarding the collection and use of data in advance and obtaining consent. The provision of the explanation and the acquisition of the consent can be performed, for example, via an in-vehicle device mounted on the target vehicle.

On the other hand, there is a case where a user wants to use data collected in the past for a purpose different from the initial purpose. In this way, if a condition that is not included in the content agreed upon in the original data provision contract is added later, it is preferable to obtain re-consent from the user.

However, in a case where a user who has provided data in the past and a user who currently uses the target vehicle are different from each other, such as a case where the target vehicle is sold, there may be a problem that a person who contacts via the in-vehicle device is not the same as a person who has given consent in the past.

An information processing device according to the present disclosure solves such a problem.

An information processing device according to a first aspect of the present disclosure includes a control unit configured to: acquire consent to collection of first data from a first vehicle from a first user via an in-vehicle device provided in the first vehicle at a first timing; and when re-consent from the first user is required to use of the first data collected from the first vehicle, issue a re-consent request to the in-vehicle device on condition that an owner of the first vehicle has not changed since the first timing.

The first data is data acquired while the first vehicle is traveling, and includes personal information of the driver and data related to the traveling of the first vehicle (for example, position information, speed information, an image of an in-vehicle camera, and the like). The first data is also referred to as sensor data.

The control unit acquires consent to providing the first data from the first user of the first vehicle via the in-vehicle device at a first timing.

On the other hand, in some cases, the first user is required to give re-consent to the use of the collected first data. For example, the purpose of use of the first data is changed after the fact.

However, if the owner of the first vehicle has changed since the timing at which the initial consent is obtained, even if the user is contacted via the in-vehicle device mounted on the first vehicle, there is a high possibility that the user will arrive at a person different from the initial user. Therefore, in such a case, the control unit reacquires the consent on condition that the owner of the first vehicle has not changed since the first timing.

According to such a configuration, it is possible to avoid contact with a user different from the user who has given the initial consent.

If the owner of the first vehicle has changed since the first timing, the control unit may resolve the problem regarding the consent by performing predetermined processing. For example, the control unit may search for contact information of the owner of the first vehicle at the first timing using a predetermined database. Thus, it is possible to identify the user who owns the first vehicle at the time.

In a case where the user who owns the first vehicle at the time cannot be identified, or in a case where re-consent cannot be obtained from the user, the control unit may execute the anonymization process on the collected first data. That is, instead of obtaining consent, the first data may be anonymized to a level that does not require consent.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

An outline of a vehicle system according to a first embodiment will be described with reference to FIG. 1. The vehicle system according to the present embodiment includes the vehicle 10 on which the in-vehicle device 100 is mounted and the server device 200. A plurality of vehicles 10 (in-vehicle devices 100) may be included in the system.

The vehicle 10 is a probe vehicle for collecting data. The vehicle 10 is configured to be able to collect data related to traveling and data related to an occupant, and can transmit the collected data to the server device 200 via the in-vehicle device 100. Examples of the traveling data include vehicle speed, traveling direction, position information, information on driving operation, information on vehicle behavior, and image data captured by an in-vehicle camera. Further, as the data related to the occupant, for example, an identifier, a gender, an age, or the like of an individual can be exemplified.

In the following description, the data collected by the vehicle 10 is referred to as sensor data. Although the sensor data is an example of "first data", the data collected by the vehicle 10 is not necessarily obtained by sensing.

The server device 200 is a device that provides a predetermined service based on sensor data collected from the vehicle 10. For example, by collecting position information and speed information from a plurality of vehicles 10, traffic information and traffic information can be generated and provided to other vehicles. In addition, by collecting data related to the occupant of the vehicle, it is possible to provide information suitable for an individual. In addition, it is possible to generate road map data by collecting images captured by the in-vehicle camera.

The server device 200 requests the plurality of vehicles 10 to transmit predetermined sensor data, and the vehicle 10 (the in-vehicle device 100) transmits the sensor data in response thereto.

The server device 200 may be a device that provides a service to the vehicle 10 (or another vehicle) based on sensor data collected from the vehicle 10. The server device 200 may be a device that relays sensor data collected from the vehicle 10 to a further external device. For example, when there are a plurality of types of sensor data collected from the vehicle 10, the server device 200 may relay the sensor data to different external devices under the management of different operators for each type of sensor data.

The server device 200 also obtains consent to providing sensor data (i.e., to transmission of the sensor data to the server device 200) from a user associated with the vehicle 10 (e.g., a driver).

The presence or absence of consent is stored in both the server device 200 and the in-vehicle device 100. The in-vehicle device 100 sends data to the server device 200 only when there is consent to providing data. The in-vehicle device 100 has a database that stores the presence or absence of consent for each type of sensor data. Based on the database, the in-vehicle device 100 determines whether there is user's consent (user gave consent in the past) to transmission of certain sensor data.

Further, the server device 200 is configured to have a function to acquire re-consent from the user at the time (that is, the user who has given consent in the past) when the conditions of use etc. are changed with respect to the sensor data collected in the past.

In the vehicle system according to the present embodiment, the plurality of in-vehicle devices 100 and the server device 200 are connected to each other via a network. The network may be, for example, a worldwide public communication network such as the Internet or the like, or a wide area network (WAN) or another communication network. The network may also include telephone communication networks for cellular phones and the like, and wireless communication networks such as Wi-Fi (registered trademark).

Each element of the system will be described.

Figure 2:
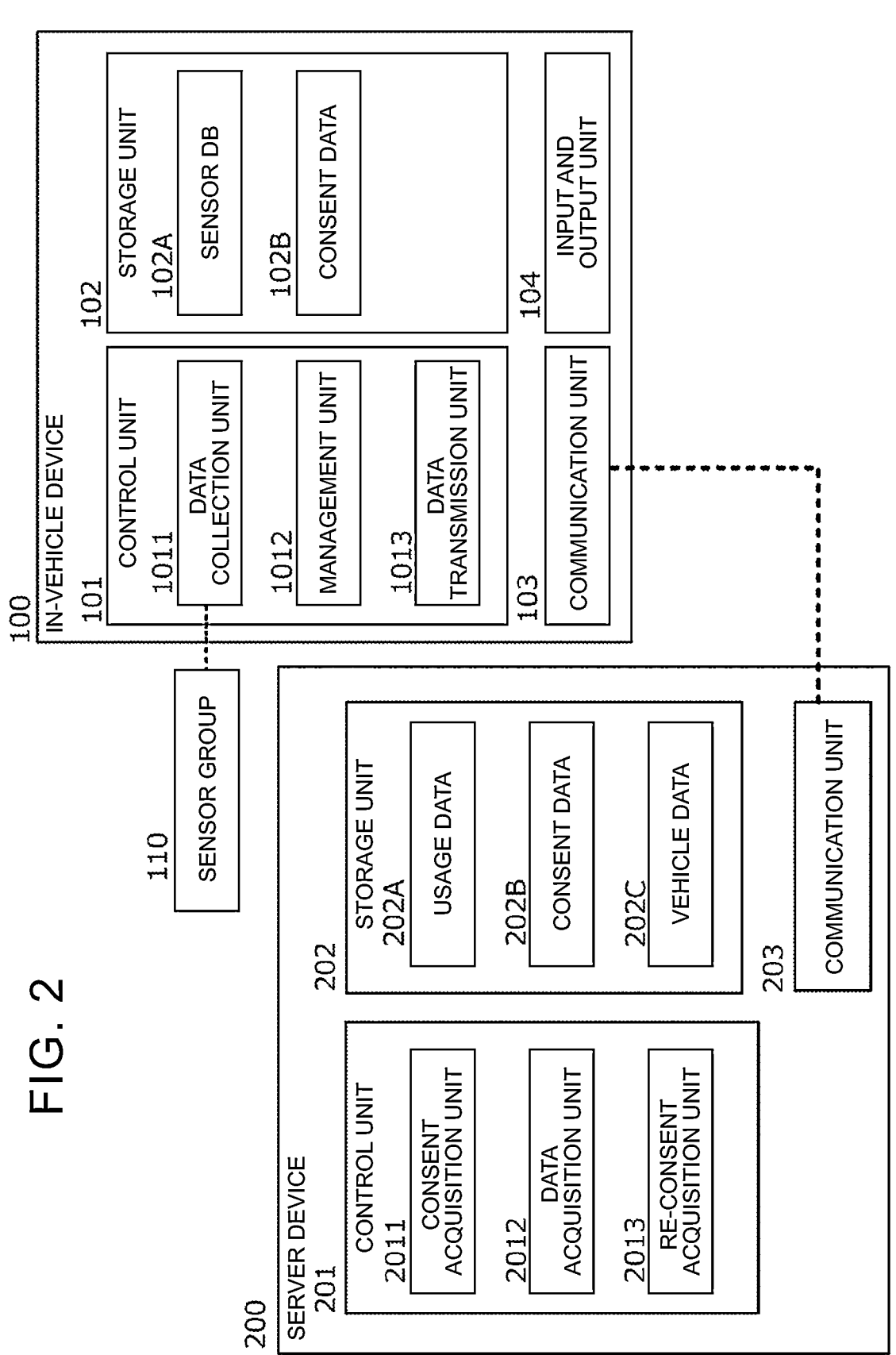
FIG. 2 is a diagram illustrating components of an in-vehicle device and a server device.

FIG. 2 is a diagram illustrating a system configuration of the in-vehicle device 100 and the server device 200.

First, a configuration of the server device 200 will be described.

The server device 200 can be configured as a computer having a processor such as a CPU or a GPU, a main storage device such as a RAM or a ROM, an auxiliary storage device such as an EPROM, a hard disk drive, and a removable medium. An operating system (OS), various programs, various tables, and the like are stored in the auxiliary storage device. The programs stored in the auxiliary storage device are executed such that various functions can be implemented that match the predetermined purpose, which will be described below. However, some or all of the functions may be implemented by a hardware circuit such as an ASIC or an FPGA. Note that the server device 200 may be configured by a single computer or may be configured by a plurality of computers that cooperate with each other.

The server device 200 includes a control unit 201, a storage unit 202, and a communication unit 203.

The control unit 201 is an arithmetic device that governs the control performed by the server device 200. The control unit 201 can be realized by an arithmetic processing device such as a CPU.

The control unit 201 includes three functional modules: a consent acquisition unit 2011, a data acquisition unit 2012, and a re-consent acquisition unit 2013. The function modules may each be implemented by executing programs, stored in the auxiliary storage unit, on the CPU.

Before acquiring the sensor data from the vehicle 10, the consent acquisition unit 2011 acquires consent to providing data from the user of the vehicle 10. The server device 200 is configured to be able to acquire or store data related to the usage of the sensor data to be acquired (hereinafter, usage data). The usage data includes, in addition to the usage of the sensor data, data related to a transmission destination of the sensor data, acquisition conditions of the sensor data, a transmission timing of the sensor data, a subject (business operator) using the sensor data, and conditions related to the data provision contract. The consent acquisition unit 2011 presents these to the user of the vehicle 10 via the in-vehicle device 100.

Based on the response from the user of the vehicle 10, the consent acquisition unit 2011 determines whether there is a consent to providing data for each type of sensor data. In addition, when an answer from the user is obtained in response to the inquiry, the consent acquisition unit 2011 stores the presence or absence of the consent in both the server device 200 and the in-vehicle device 100. When there are a plurality of sensor data to be provided or when there are a plurality of operators using the sensor data, the consent acquisition unit 2011 may acquire a comprehensive consent or may acquire a plurality of consents.

A data provision contract can be regarded as being concluded between the user and the operator who is going to receive the sensor data if the user of the vehicle 10 has consented to providing the data.

The data acquisition unit 2012 requests each of the plurality of vehicles 10 (the in-vehicle device 100) to transmit the sensor data. For example, when the server device 200 executes a service for generating road map data based on an image captured by the vehicle 10, the server device 200 requests the vehicle 10 to transmit the image data. The type of sensor data requested by the server device 200 may vary depending on the service executed by the server device 200. In addition, the data acquisition unit 2012 receives sensor data from the plurality of vehicles 10 (in-vehicle devices 100) and stores the sensor data in the storage unit 202. The stored sensor data is used to provide a predetermined service.

The re-consent acquisition unit 2013 executes a process of acquiring re-consent from the user of the vehicle 10 with respect to the use of the sensor data collected by the server device 200 in the past.

For example, a case where an image of an in-vehicle camera is provided under a condition that the image will be "used to generate a map" in the past will be considered. In this case, the provided image cannot be used for purposes other than map generation. If it is desired to use the sensor data outside the conditions, the user of the vehicle 10 must obtain re-consent. In such a case, the re-consent acquisition unit 2013 executes a process of acquiring re-consent from the corresponding user. A specific example will be described later.

The storage unit 202 includes a main storage device and an auxiliary storage device. The main storage device is a memory in which a program executed by the control unit 201 and data used by the control program are expanded. The auxiliary storage device is a device in which a program executed by the control unit 201 and data used by the control program are stored. The storage unit 202 stores sensor data collected from the vehicle 10.

In addition, the storage unit 202 stores the usage data described above. FIG. 3A is an example of usage data 202A. The usage data is data related to handling of sensor data, and includes information related to an identifier (data ID) of the sensor data, a type of the sensor data, a transmission destination of the sensor data, acquisition conditions of the sensor data, a transmission period of the sensor data, and conditions of use of the provided sensor data.

The transmission destination of the sensor data may be represented by a network address etc. Examples of the acquisition conditions of the sensor data include "an image is captured at a specific point", "a moving image is captured in a specific section", and "position information is acquired every second in a specific time zone".

In addition, the storage unit 202 stores data (hereinafter referred to as consent data) for managing the user's consent to providing the sensor data.

Here, the consent data will be described. The consent data is data for recording whether provision of the sensor data is allowed by the user of the vehicle 10 for each of the user, the transmission destination of the sensor data, and the type of the sensor data. The consent data may be generated, for example, based on a result of an interaction with a user of the vehicle 10.

FIG. 3B shows an example of consent data 202B.

As illustrated, the consent data includes fields of user ID, vehicle ID, date, data ID, transmission destination, usage terms, and availability. The user ID field is stored with an identifier that uniquely identifies a user who has consented to providing data. In the vehicle ID field, an identifier of the vehicle 10 on which the in-vehicle device 100 on which the user has operated the consent is mounted is stored. The date field stores the date of the consent. In the data ID field, information for identifying the type of sensor data is stored. The transmission destination field stores information for identifying a transmission destination of the sensor data. In the conditions-of-use field, information on conditions when the operator uses the provided sensor data is stored. In the provision-of-data field, the presence or absence of consent ("allow" or "refuse") to providing the sensor data is stored.

Further, the storage unit 202 stores data (vehicle data) related to the owner of the vehicle 10. FIG. 3C shows an example of a vehicle data 202C.

As illustrated, the vehicle datum includes the vehicle ID, the user ID, the vehicle ID and the date of updating. In the vehicle ID field, an identifier that uniquely identifies the vehicle is stored. The user ID field is stored with an identifier that uniquely identifies the owner of the vehicle. The update date is a date when the data is updated.

The communication unit 203 is a communication interface for connecting the server device 200 to a network. The communication unit 203 includes, for example, a network interface board and a wireless communication circuit for wireless communication.

Next, the in-vehicle device 100 will be described.

The vehicle 10 is a connected car having a function of communicating with an external network. The vehicle 10 is equipped with an in-vehicle device 100.

The in-vehicle device 100 is a computer for collecting information. In the present embodiment, the in-vehicle device 100 includes a plurality of sensors for collecting information related to traveling of the vehicle 10, and transmits the collected sensor data to the server device 200 at a predetermined timing. The in-vehicle device 100 may be a device (for example, a car navigation device or the like) that provides information to an occupant of the vehicle 10, or may be an electronic control unit (ECU) included in the vehicle 10. In addition, the in-vehicle device 100 may be a data communication module (DCM) having a communication function.

The in-vehicle device 100 can be configured as a computer including a processor such as a CPU and a GPU, a main storage device such as a RAM and a ROM, and an auxiliary storage device such as an EPROM, a hard disk drive, and a removable medium. An operating system (OS), various programs, various tables, and the like are stored in the auxiliary storage device. The programs stored in the auxiliary storage device are executed such that various functions can be implemented that match the predetermined purpose, which will be described below. However, some or all of the functions may be implemented by a hardware circuit such as an ASIC or an FPGA.

The in-vehicle device 100 includes a control unit 101, a storage unit 102, a communication unit 103, and an input and output unit 104. The in-vehicle device 100 is connected to the sensor group 110.

The control unit 101 is an arithmetic unit that realizes various functions of the in-vehicle device 100 by executing a predetermined program. The control unit 101 may be implemented by, for example, a CPU.

The control unit 101 includes a data collection unit 1011, a management unit 1012, and a data transmission unit 1013 as functional modules. Each functional module may be implemented by execution of a stored program by the CPU.

The data collection unit 1011 acquires sensor data from one or more sensors included in the sensor group 110 at predetermined timings, and stores the sensor data in the sensor DB 102A of the storage unit 102. When a plurality of pieces of sensor data can be acquired, the data collection unit 1011 may acquire all of the sensor data. The sensor DB 102A is a data base in which sensor data collected from sensors included in the vehicles 10 is stored.

FIG. 3D shows an example of data stored in the sensor DB 102A. The sensor DB 102A stores, in addition to the sensor data, an identifier of a user of the vehicle 10, a date and time when the sensor data is acquired, a location (position data) where the sensor data is acquired, and an ID of the sensor data.

The management unit 1012 determines, based on the consent obtained from the user of the vehicle 10, the sensor data stored in the sensor DB 102A to be transmitted to the server device 200. Specifically, the management unit 1012 executes the following processing.

(1) Process of receiving usage data from the server device 200

The server device 200 transmits the above-described usage data to the in-vehicle device 100, thereby requesting the vehicle 10 for data. In other words, the usage data also functions as data for requesting the vehicle 10 to transmit specific sensor data. As described above, the usage data includes an identifier (data ID) of the sensor data, a type (data type) of the sensor data, a transmission destination of the sensor data, acquisition conditions of the sensor data, a transmission cycle of the sensor data, and the like. The usage data may include information on the usage of the sensor data, a business operator using the sensor data, conditions of use, and the like.

The usage data transmitted from the server device 200 is stored in the storage unit 102.

(2) Process of managing consent from a user to externally transmit sensor data

External transmission refers to transmitting sensor data to a device (e.g., server device 200) external to vehicle 10 (i.e., providing sensor data externally). The management unit 1012 acquires, from the driver, whether he or she consents to providing the specific sensor data included in the usage data received from the server device 200, and generates the aforementioned consent data. The consent data is stored in the storage unit 102 (consent data 102B) and also transmitted to the server device 200 and also stored in the storage unit 202 (consent data 202B).

The management unit 1012 determines whether or not the sensor data requested by the server device 200 can be transmitted based on the consent data and the detection result of the driver.

(3) Process of identifying sensor data that is requested by the server device 200 and for which consent to transmission to the outside has been obtained.

Based on the consent data and the usage data, the management unit 1012 determines whether transmission to the outside is permitted for the requested sensor data. When transmission is permitted, the management unit 1012 determines the sensor data as a transmission target.

For example, the management unit 1012 determines that the in-vehicle device 100 has the sensor data designated by the request data. The management unit 1012 recognizes which type of sensor data is requested by referring to the data ID included in the requested data. In addition, the management unit 1012 determines whether or not the in-vehicle device 100 has the matching sensor data by comparing the acquisition conditions included in the requested data with the record recorded in the sensor DB 102A.

When the in-vehicle device 100 holds the sensor data designated by the request data and consent to providing the sensor data has been obtained, the management unit 1012 determines the sensor data as a transmission target. When there is no history in which the user of the vehicle 10 has permitted external transmission of the target sensor data, the management unit 1012 may inquire of the user of the vehicle 10 about whether or not transmission is permitted. The management unit 1012 may update the consent data based on the result of the inquiry.

The data transmission unit 1013 acquires the sensor data determined by the management unit 1012 from the storage unit 102 and transmits the sensor data to the server device 200.

The storage unit 102 is a memory device including a main storage device and an auxiliary storage device. The secondary storage device stores an operating system (OS), various programs, various tables, and the like. By loading a program stored in the auxiliary storage device into the main storage device and executing the program, it is possible to realize each function that matches a predetermined purpose, as will be described later.

The main storage device may include Random Access Memory (RAM) or Read Only Memory (ROM). The secondary storage device may include Erasable Programmable ROM (EPROM) or Hard Disk Drive (HDD). Further, the auxiliary storage device may include a removable medium, that is, a portable recording medium.

The communication unit 103 is a wireless communication interface for connecting the in-vehicle device 100 to a network. The communication unit 103 is configured to be able to communicate with the server device 200 according to a communication standard such as a mobile communication network or a radio LAN, Bluetooth (registered trademark).

The input and output unit 104 is a unit that receives an input operation performed by a user of the device and presents information. In the present embodiment, the input and output unit 104 includes one touch panel display. That is, the input and output unit 104 is composed of a liquid crystal display and a control unit thereof, and a touch panel and a control unit thereof.

The sensor group 110 is a set of a plurality of sensors included in the vehicle 10. The plurality of sensors may obtain data regarding travel of the vehicle, such as, for example, velocity sensors, accelerometers, and GPS modules. Further, the plurality of sensors may acquire data related to the traveling environment of the vehicle 10, such as an image sensor, an illuminance sensor, and a rainfall sensor.

The sensor group 110 may include a sensor for collecting data related to a driver or an occupant of the vehicle 10. For example, an occupant of the vehicle may be identified based on an image obtained by capturing an inside of the vehicle, and data related to the occupant may be transmitted as sensor data.

In addition, the sensor group 110 may include an in-vehicle camera mounted to face the outside of the vehicle. The image acquired by the in-vehicle camera can also be regarded as one of the sensor data.

The configuration shown in FIG. 2 is an example, and all or a part of the functions shown in FIG. 2 may be executed using a specially designed circuit. Further, a program may be stored or executed by a combination of the main storage device and the auxiliary storage device other than the functions shown in FIG. 2.

Next, details of a process that is performed by the in-vehicle device 100 will be described.

FIG. 4 is a flowchart of a process that is performed by the in-vehicle device 100 to transmit sensor data to the server device 200 based on the usage data received from the server device 200. The illustrated process is executed periodically while the vehicle 10 is traveling.

In parallel with the execution of the illustrated process, the data collection unit 1011 periodically acquires sensor data from the sensors included in the sensor group 110, and executes processing to store the sensor data in the sensor DB 102A of the storage unit 102.

In addition, it is assumed that the management unit 1012 executes a process of receiving usage data from the server device 200 in parallel with the execution of the illustrated process.

For example, the management unit 1012 makes an inquiry to the server device 200 to determine whether there is usage data to be received. Whether there is usage data to be received can be determined based on, for example, the last update date and time or version number of the usage data. Therefore, the server device 200 may notify the in-vehicle device 100 of the last update date and time and the version number of the usage data. In addition, the in-vehicle device 100 may store these in the storage unit 102. When there is usage data to be received, the management unit 1012 receives the usage data from the server device 200 and stores the usage data in the storage unit 102. At this time, the old usage data may be deleted.

Further, it is assumed that the in-vehicle device 100 has completed the identification of the driver at the timing of starting the processing illustrated in FIG. 4. The identification of the driver can be performed, for example, based on an image acquired by a camera provided in the driver's seat.

First, in S11, the management unit 1012 identifies sensor data requested by the server device 200 based on the usage data. In this step, the sensor data requested by the server device 200 and stored in the storage unit 102 is specified. The sensor data specified in this step may be of a plurality of types.

S12 to S15 are performed for each of the plurality of sensor data identified in S11.

First, in S12, the management unit 1012 determines whether or not the driver's consent has been obtained to transmitting the target sensor data to the server device 200. For example, if there is a record in the consent data 102B that matches the combination of the data ID indicated in the usage data and the transmission destination, and there is a record in which the provision-of-data field is "allow", this step is an affirmative determination. The negative determination in this step is made when the provision-of-data field is "refuse" or when the corresponding record does not exist (when the driver does not make an intention indication regarding external transmission with respect to the target sensor data).

When YES in S12, the process proceeds to S13, and the data transmission unit 1013 transmits the corresponding sensor data.

When NO in S12, the process proceeds to S14.

In S14, the management unit 1012 determines whether or not the driver has previously indicated the intention of refusal to transmit the sensor data having the corresponding data ID. For example, if there is a record in the consent data 102B that matches the combination of the data ID indicated in the usage data and the transmission destination, and there is a record in which the provision-of-data field is "refuse", this step is an affirmative determination. When YES in S14, the sensor data is not transmitted.

When NO in S14, the sensor data of the corresponding data ID indicates that the driver has not previously indicated the intention. The process then proceeds to S15 and asks the driver for consent.

In S15, the management unit 1012 checks with the driver whether or not the corresponding types of sensor data may be provided via the input and output unit 104. For example, the confirmation can be performed via a screen as shown in FIG. 5. The screen may include information on a type, usage, a transmission destination, an acquisition condition, and an operator using the sensor data.

In a case where there are a plurality of types of sensor data to be transmitted, the consent may be obtained on a plurality of screens, or the user may be allowed to select whether or not to agree to provide the sensor data on the same screen.

When the driver answers, the outcome is reflected in the consent data 102B and the consent data 202B. Further, S12 and S13 processes are repeated based on the content.

Figure 6:
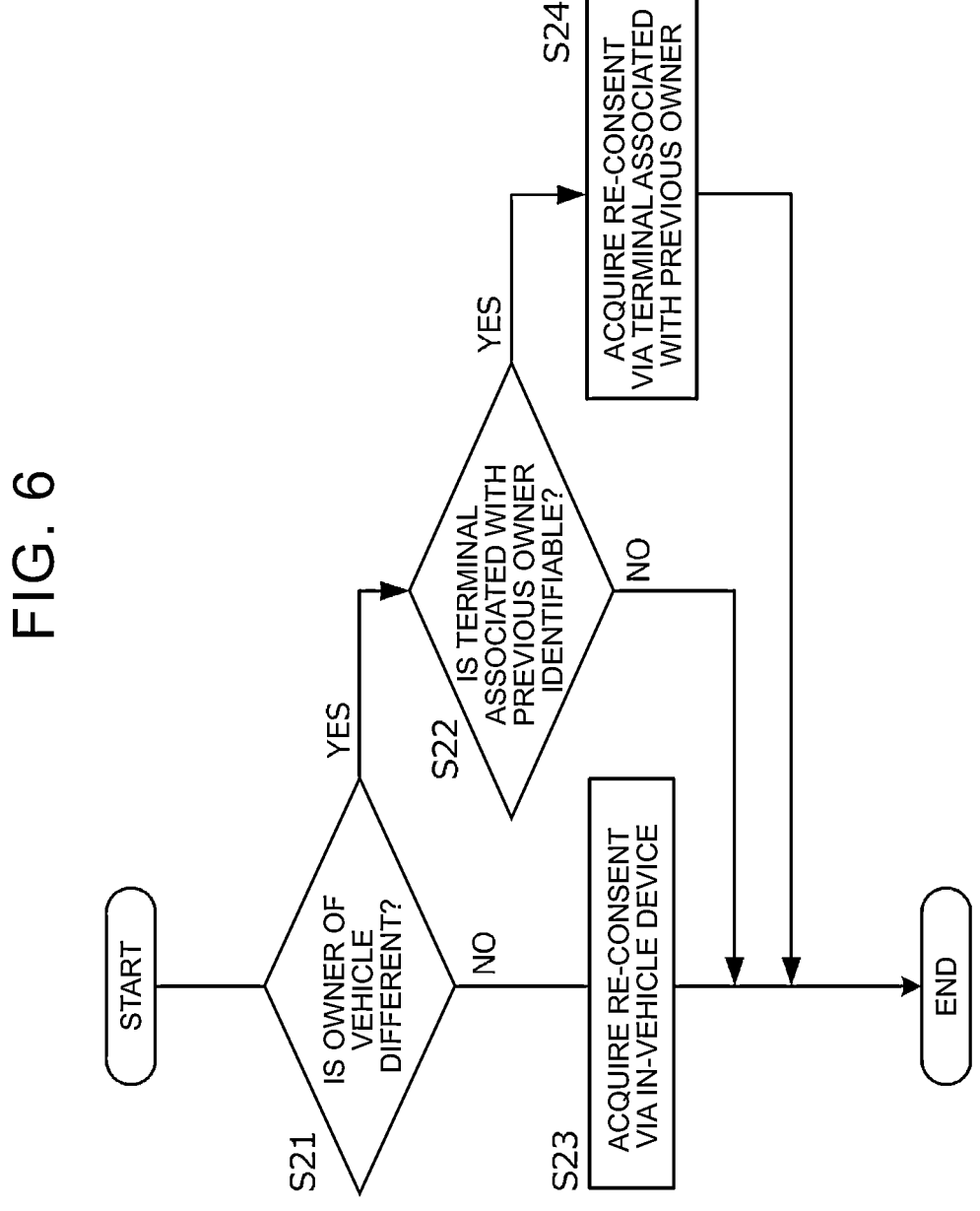
FIG. 6 is a flowchart of a process that is performed by the server device.

Next, a process executed by the server device 200 when the conditions of use of the sensor data collected in the past are changed by the server device 200 will be described. The change in the conditions of use includes, for example, a change in the usage of the sensor data from the time of the contract, a change in the business operator using the sensor data from the time of the contract, and the like. When it is necessary to use the sensor data under conditions not included in the original contract, the process shown in FIG. 6 is performed by the server device 200. The process of FIG. 6 is executed by the re-consent acquisition unit 2013 of the server device 200.

First, in S21, it is determined whether or not the present owner of the vehicle 10 (hereinafter referred to as the target vehicle) that has previously sent the target sensor data has changed from the timing at which the sensor data is acquired.

In this step, first, the record related to the past consent is extracted by referring to the consent data. Then, it is determined whether the owner of the vehicle (target vehicle) indicated by the vehicle ID included in the record has changed since when the sensor data was acquired. The owner of the present target vehicle may determine based on the vehicle data 202C stored in the server device 200.

When the owner of the target vehicle has not changed since when the sensor data was acquired, the process transitions to S23 and requests re-consent via the in-vehicle device 100 mounted on the same vehicle.

When the owner of the target vehicle has changed since when the sensor data was acquired, the process proceeds to S22.

In S22, the previous owner of the target vehicle (i.e., the user who previously gave consent). Hereinafter, it is determined whether or not a terminal associated with the target user can be identified. For example, when the vehicle currently owned by the target user can be identified, the in-vehicle device 100 mounted on the vehicle can be identified as a terminal associated with the target user. The vehicle currently owned by the target user may be identified, for example, by searching for vehicle data 202C.

When YES in this step, the process proceeds to S24. When NO in this step, the process ends.

In S24, data requesting re-consent to the use of the sensor data is sent to the terminal identified in S22. The terminal notifies the user that the conditions of use of the sensor data have been changed, and requests the user to consent to providing the data. When the consent is obtained, the consent data 102B and 202B are updated as in the above-described process.

As described above, the server device 200 according to the first embodiment acquires re-consent via the in-vehicle device 100 on condition that the owner of the vehicle has not changed since when the previous consent was obtained when the conditions of use of the sensor data collected in the past have been changed. According to such a configuration, it is possible to prevent an unrelated user (for example, a user who has purchased a target vehicle in a used vehicle) from requesting re-consent to providing data. Further, since it is possible to contact the user at the time of providing the sensor data, it is possible to further utilize the sensor data.

Modification of the First Embodiment

In the first embodiment, the server device 200 refers to the vehicle data to identify a terminal that is currently associated with the target user. On the other hand, the server device 200 may identify a terminal associated with the target user by using another data source. For example, when data for identifying contact information, an email address, a mobile terminal, etc. of a target user is available, the contact information of the target user can be acquired by accessing the data. In addition, in a case where there is a platform that manages the consent to providing data separately from the server device 200, the contact information of the target user may be acquired using the platform.

Second Embodiment

In the first embodiment, when the owner of the target vehicle has changed, the terminal associated with the previous owner (for example, the in-vehicle device 100 mounted on the vehicle after the transfer) is identified, and the re-consent is acquired via the identified terminal.

On the other hand, there are cases where it is not possible to contact the owner, such as when the owner completely releases the vehicle or when the communication function is unavailable in the vehicle after the transfer. In the second embodiment, in such a case, the sensor data collected in the past is anonymized so that the acquisition of the consent is unnecessary.

In S22 process, the server device 200 according to the second embodiment performs a process of anonymizing the target sensor data when it is determined that the terminal associated with the previous owner cannot be identified. Such a process includes, for example, a process of making identification of a user impossible by deleting or editing an item capable of specifying a user or an item capable of specifying a user by a combination. For example, data can be anonymized by replacing a unique identifier for each user with an identifier that represents age, gender, or a combination thereof.

In the present example, an example in which the identifier of the user is replaced has been described, but the method is not limited to a specific one as long as the data can be anonymized.

According to such a configuration, even in a case where it is not possible to contact the previous owner of the target vehicle, it is possible to utilize the sensor data collected in the past.

Modified Examples

The above embodiment is merely illustrative, and the present disclosure may be modified as appropriate without departing from the scope of the disclosure.

For example, the processes and means described in the present disclosure can be combined as desired as long as no technical contradiction occurs.

Further, in the explanation of the embodiment, the determination related to the owner of the vehicle is performed using the vehicle data 202C, but the owner of the vehicle does not necessarily need to make the determination using the vehicle data 202C. In addition, in S21, it is determined whether the owner of the vehicle is different, but if it is possible to determine whether the person who has consented to providing data in the past and the present user of the vehicle 10 are the same person, the determination target does not necessarily need to be the "owner of the vehicle 10".

In the description of the embodiment, a face image is exemplified as information for identifying the driver of the vehicle 10, but the driver of the vehicle 10 may identify the face image based on other biometric information. Examples of such biological information include a fingerprint, a voice print, and an iris pattern.

Further, in the description of the embodiment, only the server device 200 is illustrated as the transmission destination of the sensor data, but there may be a plurality of transmission destinations of the sensor data. In this case, the in-vehicle device 100 may receive usage data from each of the plurality of external devices. The transmission destination of the sensor data may be a manufacturer of the vehicle 10 or a related business operator, or may be a third party that has concluded a data provision contract.

Further, the processes described as being performed by a single device may be performed by a plurality of devices in a distributed manner. Alternatively, the processes described as being performed by different devices may be performed by a single device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-readonly memory (ROM), digital versatile disc (DVD), Blu-ray disc, etc.), a ROM, a random access memory (RAM), an erasable programmable read only memory (EPROM), an electrically erasable programmable read only memory (EE-PROM), a magnetic card, a flash memory, an optical card, and any type of medium suitable for storing electronic commands.

What is claimed is:

1. An information processing device comprising a control unit configured to acquire consent to collection of first data from a first vehicle from a first user via an in-vehicle device provided in the first vehicle at a first timing, in response to acquiring consent from the first user to collect the first data from the first vehicle, transmit, to the in-vehicle device, a data acquisition request to cause the in-vehicle device to collect the first data, the first data being acquired from one or more sensors associated with the first vehicle by to the in-vehicle device, retrieve, from the in-vehicle device, the first data collected by the in-vehicle device from the one or more sensors associated with the first vehicle, and when re-consent from the first user is required to use the first data collected from the first vehicle, transmit a re-consent request to the in-vehicle device based on an owner of the first vehicle being a same as the first timing.

2. The information processing device according to claim 1, wherein the control unit is configured not to issue the re-consent request to the in-vehicle device when the owner of the first vehicle has changed since the first timing.

3. The information processing device according to claim 1, wherein the control unit is configured to perform a predetermined process when the owner of the first vehicle has changed since the first timing.

4. The information processing device according to claim 3, wherein the predetermined process includes a process of searching for contact information of the owner of the first vehicle at the first timing using a predetermined database.

5. The information processing device according to claim 3, wherein the predetermined process includes a process of anonymizing the collected first data.

6. The information processing device according to claim 1, wherein re-consent from the first user is required to use the first data in a case where the first data is to be used in a condition different from a condition that was agreed upon at the first timing.

* * * * *